April 2, 1940.    S. M. WECKSTEIN    2,195,794

ROLL NECK BEARING MOUNTING

Filed Dec. 27, 1938

INVENTOR:
Samson M. Weckstein,
by Cantlan & Josund,
HIS ATTORNEYS.

Patented Apr. 2, 1940

2,195,794

UNITED STATES PATENT OFFICE 2,195,794

ROLL NECK BEARING MOUNTING

Samson M. Weckstein, Canton, Ohio, assignor to The Timken Roller Bearing Company, Canton, Ohio, a corporation of Ohio Application December 27, 1938, Serial No. 247,775

5 Claims. (Cl. 308—214)

My invention relates to the mounting of bearings on the necks of the rolls of rolling mills and the like.

The invention has for its principal objects a simple and effective closure for the bearings of rolling mill roll necks and the like and a bearing mounting wherein the bearing is properly positioned but is not pressed in place.

The invention consists principally in an inner bearing member for mounting on a shouldered roll neck, said inner bearing member having a projecting sleeve at one end whose bore is larger than the roll neck and having an inwardly extending radial flange at the other end for positioning the bearing cone by cooperation with the shoulder on the roll neck. The invention further consists in the roll neck bearing mounting and in the parts and combinations and arrangements of parts hereinafter described and claimed.

Figure 1:
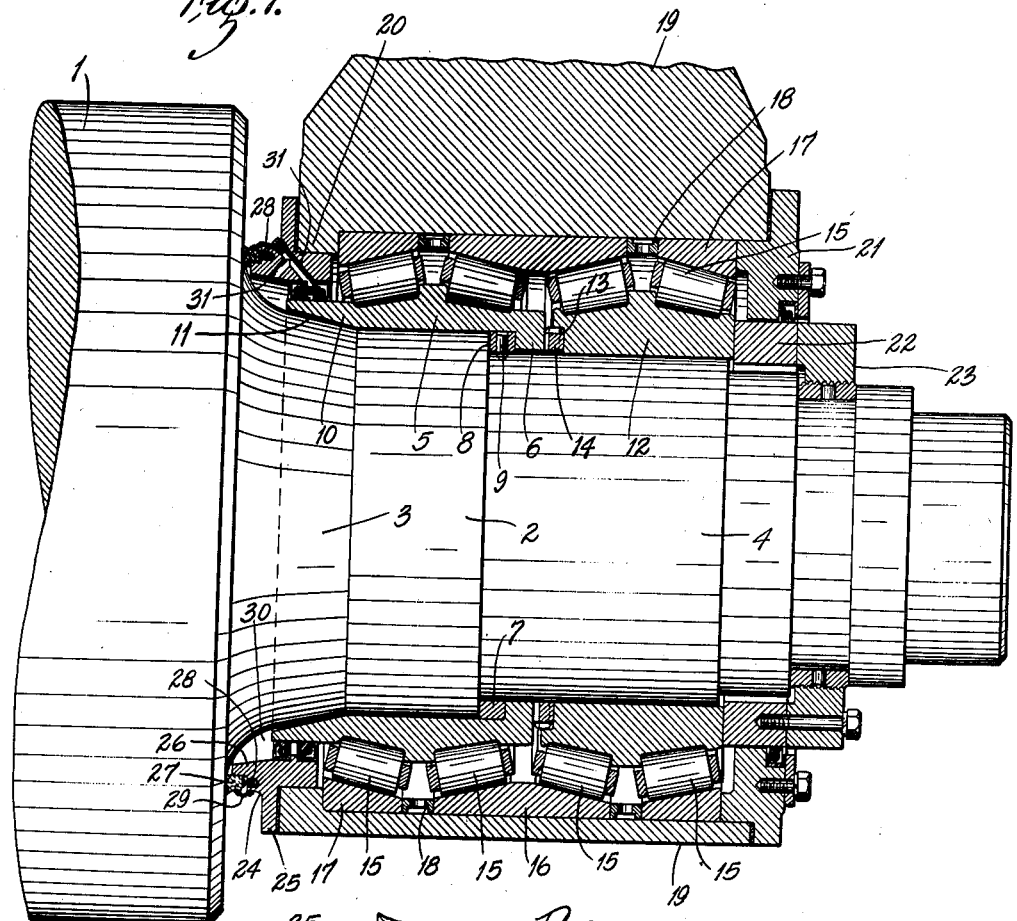
Figure 2:
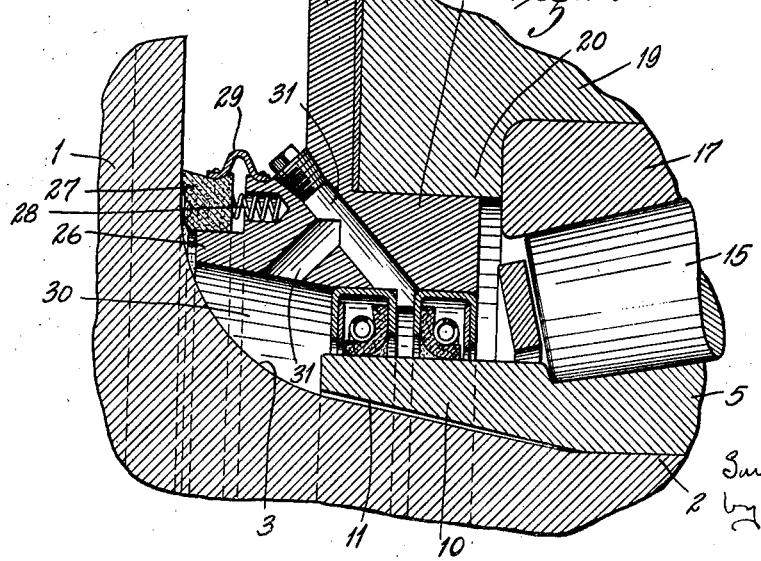

In the accompanying drawing,

Fig. 1 is a longitudinal sectional view of a roll neck bearing mounting embodying my invention; and Fig. 2 is a longitudinal sectional view on an enlarged scale of the bearing closure portion of the mounting.

In the drawing is illustrated the end portion of a roll 1 of a rolling mill, a back-up roll being indicated. Said roll 1 has a reduced neck portion with a cylindrical body or bearing seat 2, a portion 3 flaring from said body toward the end of the roll 1 and a further reduced cylindrical portion 4 at the outer end of said body forming a second bearing seat.

Mounted on the first bearing seat 2 of the roll neck is a double row cone or inner bearing member 5 which has an inwardly extending radial flange 6 at its outermost end, said flange 6 abutting against a hardened spacer ring 7 interposed between its inner face and the shoulder 8 at the end of the innermost bearing seat portion 2 of the roll neck. Said spacer ring 7 is secured to the reduced portion 4 of the roll neck by means of pins 9.

At the innermost end, adjacent to the roll 1, said cone 5 is provided with a projecting sleeve 10 with a cylindrical exterior and with a conical bore 11 that is larger than the flaring portion 3 of the roll neck, but has substantially the same degree of taper. Thus the sleeve portion 10 of the cone is free from contact with the roll neck.

Mounted on the outermost or second bearing seat portion 4 of the roll neck is a double row cone 12 which has a rabbet 13 in its innermost end face in which is mounted a ring 14 for spacing the cone 12 properly with respect to the outermost end of said first cone 5. Mounted on the raceways of the two cones are bearing rollers 15. A double cup 16 or outer bearing member is provided for the two middle series of rollers 15 and individual cups 17 are provided for the outermost series of rollers 15, said single cups 17 being spaced from the double cup 16 by suitable spacer rings 18.

Said bearing cups are mounted in the bore of a housing 19 which has an integral flange 20 at its innermost end, against which the innermost bearing cup 17 abuts and a closure and retaining ring 21 at its outer end against which the outermost bearing cup 17 abuts. A keyed ring 22 and lock nut 23 are provided for engagement with the outermost end of the bearing cone 12 to hold the bearings on the roll neck.

Mounted in the innermost end of the bearing housing 19 is a closure ring 24 which has a radial flange 25 abutting against the face of the housing and suitably secured thereto. Said closure ring 24 is provided with sealing members or portions 25 encircling the cylindrical sleeve 10 of the bearing cone. Said closure ring 24 is provided with a portion 26 that extends into proximity with the end of the roll 1 and is provided with suitable closure means for cooperating with said roll. The means illustrated includes a felt or other packing ring 27, a plurality of springs 28 for pressing it toward the roll and a securing ring 29 overlapping the end closure ring and holding the packing ring 27 in place.

The chamber 30 formed between the roll seal ring 27 and the sleeve seal rings 25 may be packed with heavy grease through filling bores 31, thus effectively preventing the entrance of water into the bearings.

The above described arrangement has important advantages. It eliminates the pressing of the bearing cone on the roll neck, thus minimizing the stresses and strains in said roll neck. It permits of a maximum diameter of roll neck and flaring from the body of the roll thus giving a stronger neck able to carry heavier loads. The spacer ring and the shoulder on the roll neck may be suitably treated to withstand any wear that may follow slight creeping of the bearing cone. The spacing of the sleeve from the roll neck further relieves the roll neck of strain. The closure arrangement is very simple and effective, providing a double seal, one against the end face of the roll and the other on the sleeve portion of the bearing cone. The grease chamber excludes water from the bearings, which is an important and difficult problem in rolling mill bearing mountings. Obviously, numerous changes may be made without departing from the invention and I do not wish to be limited to the precise construction shown.

What I claim is:

1. A roller bearing mounting comprising a rotary member having a cylindrical body, a portion flaring from one end of said body and a reduced cylindrical portion extending from the other end of said body, and an inner bearing member on said body, with one end projecting over said reduced portion, said projecting portion having a flange extending radially inward, said inner bearing member having a sleeve projecting from its unflanged end, said sleeve having a flaring bore of larger size than the flaring portion of said rotary member.

2. A roller bearing mounting comprising a rotary member having a cylindrical body, a portion flaring from one end of said body and a reduced cylindrical portion extending from the other end of said body, an inner bearing member on said body, with one end projecting over said reduced portion, said projecting portion having a flange extending radially inward, and a hardened spacer ring between said flange and the shoulder at the end of said body, said inner bearing member having a sleeve projecting from its unflanged end, said sleeve having a flaring bore of larger size than the flaring portion of said rotary member.

3. A roller bearing mounting comprising a roll with a neck portion having a cylindrical body, a portion flaring from one end of said body toward the roll and a reduced cylindrical portion extending from the other end of said body, an inner bearing member on said body, with one end projecting over said reduced portion, said projecting portion having a flange extending radially inward, and a hardened spacer ring between said flange and the shoulder at the end of said body, said inner bearing member having a sleeve projecting from its unflanged end, said sleeve having a flaring bore of larger size than the flaring portion of said roll neck.

4. A roller bearing mounting comprising a roll with a neck portion having a cylindrical body, a portion flaring from one end of said body toward the roll and a reduced cylindrical portion extending from the other end of said body, an inner bearing member on said body, with one end projecting over said reduced portion, said projecting portion having a flange extending radially inward, a hardened spacer ring between said flange and the shoulder at the end of said body, said inner bearing member having a sleeve projecting from its unflanged end, said sleeve having a flaring bore of larger size than the flaring portion of said roll neck, bearing rollers on said inner bearing member, outer bearing members, a bearing housing, and closure means for said bearing housing, said closure means having a sealing portion cooperating with said sleeve.

5. A roller bearing mounting comprising a roll with a neck portion having a cylindrical body, a portion flaring from one end of said body toward the roll and a reduced cylindrical portion extending from the other end of said body, an inner bearing member on said body, with one end projecting over said reduced portion, said projecting portion having a flange extending radially inward, a hardened spacer ring between said flange and the shoulder at the end of said body, said inner bearing member having a sleeve projecting from its unflanged end, said sleeve having a flaring bore of larger size than the flaring portion of said roll neck, bearing rollers on said inner bearing member, outer bearing members, a bearing housing, and closure means for said bearing housing, said closure means having a sealing portion cooperating with said sleeve, and a sealing portion cooperating with the end of said roll.

SAMSON M. WECKSTEIN.